United States Patent
Frizzell et al.

(10) Patent No.: US 7,695,541 B1
(45) Date of Patent: Apr. 13, 2010

(54) NON-ACIDIC, HIGH CALCIUM LOAD AQUEOUS FERTILIZER

(76) Inventors: Raymond B. Frizzell, 15 Sandy La., Bristol, RI (US) 02809; Michael J. Loosemore, 18 Landcaster St., Auburn, MA (US) 01501

( * ) Notice: Subject to any disclaimer, the term of this patent is extended or adjusted under 35 U.S.C. 154(b) by 113 days.

(21) Appl. No.: 12/053,711

(22) Filed: Mar. 24, 2008

(51) Int. Cl.
*C05D 3/00* (2006.01)
*C05D 3/02* (2006.01)
*C05D 9/02* (2006.01)

(52) U.S. Cl. .............. 71/11; 71/33; 71/53; 71/63; 71/64.1

(58) Field of Classification Search .......... 71/64.1, 71/53, 33, 63, 11
See application file for complete search history.

(56) References Cited

U.S. PATENT DOCUMENTS

| | | | | |
|---|---|---|---|---|
| 3,231,365 A | * | 1/1966 | Wahlberg | 71/1 |
| 5,252,118 A | * | 10/1993 | Brown | 71/23 |
| 5,681,366 A | * | 10/1997 | Herold et al. | 71/27 |
| 5,759,226 A | * | 6/1998 | Herold et al. | 71/54 |

* cited by examiner

*Primary Examiner*—Wayne Langel
(74) *Attorney, Agent, or Firm*—Schwenning Legal Services

(57) ABSTRACT

A non-acidic, aqueous fertilizer suspension having a pH equal to or greater than 7 includes at least one water-insoluble calcium salt and at least one water-soluble calcium salt. The water-insoluble salt may be calcium carbonate, calcium phosphate tribasic, and calcium phosphate dibasic while the water soluble salt may be calcium acetate, calcium citrate, calcium chloride, calcium gluconate, calcium hydroxide, calcium lactate, calcium lignosulfate, and calcium iodate. The fertilizer suspension may include a multifunctional surfactant/dispersing agent/thickener, a multifunctional chelator/dispersant/stabilizer, a biocide and at least one plant nutrient selected from the group consisting of boron, copper, iron, magnesium, manganese, and zinc. In the fertilizer compositions, the total calcium salts comprise about 2% to about 70% by weight of the composition and the water-insoluble calcium salt comprises at least about 50% by weight of the total of the water-insoluble and water-soluble calcium salts.

20 Claims, No Drawings

US 7,695,541 B1

NON-ACIDIC, HIGH CALCIUM LOAD AQUEOUS FERTILIZER

TECHNICAL FIELD

The present invention relates to aqueous, non-acidic, stable fertilizer suspensions that provide a high calcium load with a reservoir of slowly released calcium. The unique fertilizer compositions provide important buffering of acids present in the soil and precipitation, resulting in the harmless by-products of water and carbon dioxide. The neutralization also releases calcium from an insoluble reservoir of calcium carbonate.

BACKGROUND

Calcium is an essential macro nutrient for plant growth. Calcium is needed by plants for cell growth and division, for the growth of root tips and shoot tips, the retention of leaves and as an integral part or the cellular structural integrity. Efforts to supply calcium in a fertilizer have been complicated by the poor alkaline solubility of calcium salts. This poor solubility leads to problems in storage due to product instability and in application where calcium precipitates can clog irrigation drip feed lines. Prior attempts to solve these problems have produced solid formulations, which require the inconvenience and time to solubilize these solid formulations on site. See for example, U.S. Pat. Nos. 5,171,349, 5,395,418 and 6,312,493.

Attempts to provide aqueous, calcium-based fertilizers have relied on soluble calcium salts that result in an acidic formulation. As an example, see U.S. Pat. No. 5,997,602 which describes various aqueous fertilizer suspensions that have a pH in the range of 0.5 to 2. These formulations also use soluble calcium salts which can readily and rapidly leach from the soil. Another disadvantage is that these low acid formulations may exacerbate acid soil conditions and the effects of the ever-more-common acid precipitation. Yet another disadvantage of these types of aqueous calcium fertilizers is the relatively low concentrations of calcium that can be achieved with the use of soluble salts.

An attempt to prepare a stable aqueous fertilizer suspension that provides sufficient nitrogen, phosphorus, and potassium (referred to as "NPK" materials) in addition to other plant micronutrients such as calcium and magnesium is described in U.S. Pat. No. 5,851,260. This patent teaches fertilizer suspensions that have a pH in the range of 2 to less than 7 and that have a particle size of less than 50 microns and more preferably 0.2-20 microns. This approach requires extensive and costly processing that includes at least two millings to produce very small suspendable particles. This approach also has the disadvantages of requiring significant manufacturing effort and of producing a surface crusting and slight precipitation of the ingredients.

As such, it would be desirable to provide an aqueous, non-acidic calcium-based fertilizer that will not leach from the soil and provide neutralization of the acidity in the soil and precipitation. As used herein, "non-acidic" refers to any neutral or alkaline composition having a pH in the range of 7.0 to 14.

SUMMARY

Examples of the present invention provide neutral to alkaline pH, aqueous fertilizer compositions that provide high loads of calcium salts ranging from about 2% to about 70% by weight of the composition. Exemplary formulations include at least one water-insoluble calcium salt and preferably, at least one water-soluble calcium salt. In the exemplary formulations, the total calcium salts comprise about 2% to about 70% by weight of the composition and the water-insoluble calcium salts comprise at least about 50% by weight of the total of the water-insoluble and water-soluble calcium salts.

The exemplary formulations may include a multifunctional surfactant/dispersing agent/thickener/stabilizer to reduce surface tension, improve plant surface adhesion, soil penetration and rewetting and/or to keep all components in a suspension. Alternatively, a separate surfactant/wetting agent and a thickener/stabilizer may be used to accomplish any or all of the above functions. In addition, a multifunctional chelator/dispersant/stabilizer may be included to chelate any of the metal ions present such as the calcium and to trap the excess calcium for later release. The exemplary formulations may also include other plant nutrients, for example, iron, magnesium, copper, zinc, and other minerals known to be essential for plant growth as well as a biocide to prevent the growth of mold, algae, fungus or other invasive parasites and organisms.

In one embodiment, a non-acidic, aqueous fertilizer composition is described comprising at least one water-insoluble calcium salt selected from the group consisting of calcium carbonate, calcium phosphate tribasic, calcium phosphate dibasic and mixtures thereof; at least one water-soluble calcium salt selected from the group consisting of calcium acetate, calcium citrate, calcium chloride, calcium gluconate, calcium hydroxide, calcium lactate, calcium lignosulfate, calcium humate, calcium iodate and mixtures thereof; a thickening agent in the range of about 0.1% to about 5% by weight; a multifunctional chelator/dispersant/stabilizer in the range of about 0.1% to about 20% by weight, and optionally a surfactant/wetting agent, wherein the total calcium salts comprise about 2% to about 70% by weight of the composition and the water-insoluble calcium salts comprise at least about 50% by weight of a total of the water-insoluble and water-soluble calcium salts.

In an alternate embodiment, a non-acidic, aqueous fertilizer composition is described consisting essentially of at least one water-insoluble calcium salt selected from the group consisting of calcium carbonate, calcium phosphate tribasic, calcium phosphate dibasic and mixtures thereof; at least one water-soluble calcium salt selected from the group consisting of calcium acetate, calcium citrate, calcium chloride, calcium gluconate, calcium hydroxide, calcium lactate, calcium lignosulfate, calcium humate, calcium iodate and mixtures thereof; a multifunctional surfactant/dispersing agent/thickening agent in the range of about 0.1% to about 5% by weight; a multifunctional chelator/dispersant/stabilizer in the range of about 0.1% to about 20% by weight; a biocide in the range of about 0% to about 2% by weight; and at least one plant nutrient selected from the group consisting of boron, copper, iron, magnesium, manganese, zinc and their salts and mixtures thereof, wherein the total calcium salts comprise about 2% to about 70% by weight of the composition and the water-insoluble calcium salts comprise at least about 50% by weight of a total of the water-insoluble and water-soluble calcium salts. This embodiment may also optionally include the use of dyes or contrast enhancers such as FD&C (Food Drug and Cosmetic) and or D&C (Drug and Cosmetic) certified dyes and or pigments.

Examples of the present invention provide a rheologically-controlled composition such that it is shear sensitive to allow for pumping or spraying, but which recovers its viscosity to aid in the formulation clinging to plants and soil. As such, methods are also described for providing immediately-available and slowly-released calcium to fertilize plants or crops while neutralizing the acidity present in the soil and acid precipitation. These methods may include applying the fertilizer composition to the plant or crop leaves, flowers, stems, roots or other exposed parts of the plant or crop. Alternatively, or in addition, the composition may be applied to the soil in which the plants or crops are present to fertilize the plant or crop and provide a reservoir of insoluble calcium salt that is released to the soil, plant or crop upon interaction with acid precipitation or soil acidity. These methods may include diluting the fertilizer composition to prepare a diluted solution containing between 0.2% to 20% by weight total calcium salts and then applying the diluted solution to the plant, crop or soil. In addition, these methods may involve applying the composition by spraying or drip irrigation and provides for the composition to be topically applied to a plant or crop such that the composition will adhere to at least one surface of a plant or crop and drip into a plant's or crop's root zone.

A particularly surprising and unexpected advantage of the present invention relates to the protection of plants from sunscald or sunburn. The opaque nature of the composition due to the high concentration of insoluble calcium carbonate plus the adherence to the plant surface provided by the wetting agent, surfactant, dispersant, and/or thickener and the unique spray capability due to the formulation rheology allow this product to be spray applied in both concentrated and diluted forms directly onto the plant surface. As a result, methods to reduce or prevent sunscald and/or sunburn of plants or crops are also described which include topically applying one of the exemplary fertilizer compositions to the sun-exposed surfaces of crops or plants to form an adherent, opaque film that reflects sunlight and slowly re-solubilizes over time. Using these methods, an adherent reflective coating of varying thickness can be formed, thus providing variable protection from the sun.

DETAILED DESCRIPTION OF EMBODIMENTS

Exemplary compositions of the present invention provide a stable, high calcium load fertilizer with a reservoir of available, slowly-released calcium and non-acid pH of 7 or greater. The unique fertilizer compositions of the present invention provide important buffering of acids present in the soil and precipitation and may utilize this neutralization as a mechanism to release calcium from the insoluble reservoir of calcium. The carbonate anion from the calcium salt has the capacity to neutralize environmental acids resulting in the formation of the harmless by-products of water, carbon dioxide and calcium that can all be utilized by the plant.

Exemplary formulations may include at least one water-insoluble calcium salt and at least one water-soluble calcium salt. The calcium salts may comprise about 2% to about 70% by weight of the composition. Preferably, the water-insoluble calcium salts comprise at least about 50% by weight of the total water-insoluble and water-soluble calcium salts. Alternatively, the water-soluble calcium salts may comprise from about 0% to 20% by weight of the composition.

Water-insoluble calcium salts suitable for use in the exemplary compositions include calcium carbonate, calcium phosphate tribasic, calcium phosphate dibasic and other calcium salts known to those familiar with the art. In one embodiment, calcium carbonate (Omyacarb 3, Omya Inc.; Procter, Vt.) is used. Calcium carbonate may be obtained from many commercially available sources, but it need not be. For example, mussel, clam and scallop shells contain a large concentration of calcium carbonate and could be processed to provide a source of calcium carbonate. Advantages of such a source of calcium carbonate include the presence of trace minerals derived from the aqueous source of the shells and the fact that utilizing these shells would tap a renewable source of calcium carbonate. Also, such usage has the benefit of making useful an otherwise waste material. Typically the calcium carbonate could be obtained from shell material by a grinding process whereby the shell material is reduced to a particle of whatever size is desired.

In the exemplary compositions, the insoluble calcium salt has a mean particle size of about 100 microns or less. A more preferred particle size is about 20 microns or less. In one embodiment, the insoluble calcium salt has a mean particle size that is about 3 microns or less. These particle sizes of calcium carbonate are readily available in the commercial market and the products of commerce require no special or additional processing prior to incorporation into the formulation. This is in contrast, for example, to the multi-step milling process required in production of the formulations of U.S. Pat. No. 5,851,260 (See col. 3, lines 44-54).

The water-soluble calcium salts may include calcium acetate, calcium citrate, calcium chloride, calcium gluconate, calcium hydroxide, calcium lactate, calcium lignosulfate, calcium humate and calcium iodate. In one embodiment, calcium acetate (Niacet Corporation, Niagara Falls, N.Y.) and calcium citrate (Maypro Industries Inc., Purchase New York) are used as the preferred water-soluble calcium salt.

Exemplary compositions may include a thickening agent/stabilizer in the range of about 0.1% to 5% by weight or alternatively, in the range of about 0.2% to 2% by weight. Examples of compounds suitable for use as the thickening agent/stabilizer include, but are not limited to, xanthan gum, hydroxyethylcellulose, hydroxypropylcellulose and guar gum. Commercial names for suitable thickening agents include, but are not limited to, Kelzan AR and Celflow. In one embodiment, xanthan gum (Kelzan AR, CP Kelco Company, San Diego, Calif.) is used in the range of 0.7% to 1% by weight.

In general, the exemplary compositions are formulated to be rheologically controlled such that they are shear sensitive to allow for pumping or spraying, yet the compositions recover its viscosity to aid in the formulation clinging to plants and soil. In one embodiment, the exemplary compositions have a viscosity in the range of 100 centipoise to 15,000 centipoise. In alternate embodiments, the exemplary compositions may have a viscosity in the range of about 1000 centipoise to about 10,000 centipoise. In additional embodiments, the exemplary compositions have a viscosity in the range of about 3000 centipoise to about 8,000 centipoise, 3500 centipoise to 7000 centipoise, 3500 centipoise to 5000 centipoise and 5000 centipoise to 7000 centipoise.

The exemplary compositions may also include a multifunctional chelator/dispersant/stabilizer. Examples of compounds that provide one or more of these functions include sodium ligninsulfonate (Borresperse NA; Ligno Tech USA Inc.; Rothschild, Wis.), calcium ligninsulfonate (Borresperse CA; Ligno Tech USA Inc.; Rothschild, Wis.); humic acid (Borregro HA-1 or Borregro HA-2; Ligno Tech USA Inc.; Rothschild, Wis.), and their salts and mixtures thereof. It is recognized herein that humic acid and its neutralized form humate can be used interchangeably in the present invention to the identical end result and that the term "humate" may be used in reference to both of these forms. In one embodiment, the exemplary compositions include the multifunctional chelator/dispersant/stabilizer in the range of about 0.1% to about 20% by weight, and more preferably, in the range of about 0.2% to about 5% by weight.

It has been surprisingly found that the inclusion of ligninsulfonate helps to stabilize the insoluble calcium in the formulations of this invention. As used herein, the terms "ligninsulfonate" and "lignosulfonate" denote equivalent compounds. Without being bound by theory, it is theorized that due to the known chelation capacity of ligninsufonates and the solubility of calcium loaded calcium ligninsulfonates, the ligninsulfonates bind calcium as it is released from the insoluble calcium source by acid in the soil or precipitation. This makes the released calcium available as a soluble ligninsulfonate complex.

Examples of this invention also allow the compatible inclusion of other plant nutrients, for example, iron, magnesium, copper, zinc, and other minerals known to be essential for plant growth by those familiar with the art. These plant nutrients may be provided in many forms including salts and oxides.

Ideally, the exemplary compositions include a biocide or other active ingredient to prevent the undesired growth of mold, algae, fungus and other undesirable micro-organisms on the plant or crop. Examples of types of biocides include, but are not limited to, an acaricide, a bactericide, a fungicide, a herbicide, an insecticide, a larvicide, a molluskicide, a nematicide, a rodenticide, a viricide and mixtures thereof. Examples of suitable biocides include Canguard BIT 20 and Ucarcide 250 (Dow Chemical Corporation; Midland Mich.)

The exemplary fertilizer compositions as described above may be applied to the crops/plants and/or directly to the soil in a variety of methods that include, but are not limited to, spraying and drip irrigation. In addition, the compositions may be applied in either concentrated or diluted forms. In one embodiment, dilution rates in the range of 3:1 to 5:1 of water: fertilizer composition provide very good fertilization as well as sun protection due to the opaque qualities of the fertilizer composition that forms a protective film over the sun-exposed crop/plant surfaces. If the prevention of sunburn or sunscald is less of a concern, dilution rates up to about 7:1 of water: fertilizer composition provide sufficient fertilization capacity. In yet another embodiment, a diluted solution containing between 0.2% to 20% by weight of total calcium salts may be used to provide both good fertilization and sun burn/scald protection.

In an alternative embodiment, the fertilizer composition may be used in a 1:1 ratio of water:fertilizer composition or completely undiluted to control pollution by capturing dust from storage piles of solid substances such as ground coal. With respect to coal dust control, the fertilizer composition may be applied full strength to create a barrier coating (eggshell) over coal piles. The fertilizer composition may run slightly when rained on, further penetrating the pile, and then re-solidify. A typical application rate for this use is 250 to 300 sq. ft. per gallon at full strength. Alternatively, the fertilizer composition can be used to control ash dust after combustion of a fuel. In this case, the fertilizer composition may be applied to an ash pile to create a barrier coating at an application rate of 250 to 300 sq. ft. per gallon at full strength. The use of the fertilizer composition with ash can be used to produce Portland cement.

In yet another alternative use, the fertilizer composition can be spray injected into a furnace to bring about the neutralization of acidic combustion species such as oxides of sulfur and nitrogen resulting in the production of the respective calcium salts. In addition, the fertilizer composition can also be injected into flue gases to capture particulates neutralize acidity, reduce volume of waste, and produce farm-grade land plaster. In these applications, the fertilizer composition may be misted at full strength with high pressure injectors.

Several working examples of this invention are provided without intending to limit the scope of the invention to only these examples. Unless noted otherwise, percentages are expressed as weight percents of the total composition.

Example 1

A composition of about 30% by weight of calcium carbonate having a mean particle size of about 3 microns also includes xanthan gum in the range of 0.8% to 1.0% by weight; a non-ionic surfactant at about 2.0% by weight; a biocide at about 0.2% by weight; and water to 100% by weight. This formulation has a viscosity of about 7000 centipoise, a pH of about 7.5 and is stable for up to one year at room temperature.

Example 2

A composition containing calcium carbonate in the range of about 30% to 50% by weight also includes xanthan gum in the range of about 0.7% to 1.0% by weight; ligninsufonate in the range of about 1.0% to 3.0% by weight; biocide at about 0.2% by weight; and water to 100% by weight. This formulation has a viscosity of about 7000 centipoise, a pH of about 7.0 to 8.0, and is stable for up to one year at room temperature.

Example 3

A composition containing calcium carbonate in the range of about 30% to 40% by weight also includes xanthan gum in the range of about 0.6% to 1.2% by weight; calcium ligninsulfonate at about 3.5% by weight; a biocide at about 0.4% by weight; and water to 100% by weight. This formulation has a viscosity of about 5000 centipoise, a pH of about 7.0 to 8.0 and is stable for up to one year at room temperature.

Example 4

A composition containing about 25% by weight of calcium carbonate also includes xanthan gum at about 0.5% by weight; sodium ligninsulfonate at about 2.0% by weight; calcium ligninsulfonate at about 1.0% by weight; a non-ionic surfactant at about 3.0% by weight; calcium acetate in the range of about 2.0% to 5.0% by weight; a biocide at about 0.4% by weight; and water to 100% by weight. This formulation has a viscosity of about 3500 centipoise, a pH of from 7.0 to 8.5, and is stable for up to one year at room temperature.

Example 5

A composition containing about 20% by weight of calcium carbonate also includes calcium citrate at about 10% by weight; xanthan gum at about 0.6% by weight; calcium ligninsulfonate at about 5.0% by weight; a non-ionic surfactant at about 3.0% by weight; humic acid in the range of about 1.0% to 3.0% by weight; a biocide at about 0.8% by weight and water up to 100% by weight. This formulation has a viscosity of about 6000 centipoise, a pH of about 7.0 to 8.5 and is stable for up to one year at room temperature.

Example 6

A fertilizer suspension of calcium carbonate in the range of about 20% to 40% by weight also includes xanthan gum in the range of about 0.4% to 0.8% by weight; humate in the range of about 0.5% to 5% by weight; calcium acetate in the range of about 2.0% to 10% by weight; an effective amount of biocide; and water in the range of about 44% to 68% by weight. This formulation has a viscosity of about 3500 to 7000 centipoise, a pH of from 7.0 to 8.5, and is stable for at least three months at room temperature.

Example 7

A suspension of calcium carbonate containing about 32% by weight also includes calcium acetate at about 5.0% by weight; xanthan gum at about 0.6% by weight; humate at about 0.6% by weight; a biocide at about 0.3% by weight; and water at about 61.5% t by weight. This formulation has a viscosity of about 6000 centipoise, a pH of about 8.0 and is stable for at least three months at room temperature.

Example 8

A suspension of calcium carbonate containing about 30% by weight also includes calcium acetate at about 2.0% by weight; xanthan gum at about 0.6% by weight; humate at about 0.9% by weight; a biocide at about 0.3% by weight and water at about 61.2% by weight.

Example 9

A suspension of calcium carbonate containing about 30% by weight also includes calcium acetate at about 2.0% by weight; xanthan gum at about 0.6% by weight; humate at about 0.9% by weight, a biocide at about 0.3% by weight; a nonionic surfactant/wetting agent at about 2.0% by weight and water at about 59.2% by weight.

Example 10

A suspension of calcium carbonate containing about 30% by weight also includes calcium acetate at about 2.0% by weight; xanthan gum at about 0.6% by weight; humate at about 0.9% by weight; calcium lignosulfonate at about 2.0% by weight; a biocide at about 0.3% by weight; a nonionic surfactant/wetting agent at about 2.0% by weight and water at about 57.2% by weight.

Example 11

A suspension of calcium carbonate containing about 30% by weight also includes calcium acetate at about 2.0% by weight; xanthan gum at about 0.6% by weight; humate at about 0.9% by weight; calcium lignosulfonate at about 2.0% by weight; a biocide at about 0.3% by weight; and water at about 59.2% by weight.

The above explained embodiments are exemplary of the invention of the present application which is described solely by the claims appended below. It should be understood that modifications of the embodiments may be made as would occur to one of skill in the art.

What is claimed is:

1. A non-acidic, aqueous fertilizer composition comprising:
    at least one water-insoluble calcium salt selected from the group consisting of calcium carbonate, calcium phosphate tribasic, calcium phosphate dibasic and mixtures thereof;
    at least one water-soluble calcium salt selected from the group consisting of calcium acetate, calcium citrate, calcium chloride, calcium gluconate, calcium hydroxide, calcium lactate, calcium lignosulfate, calcium iodate and mixtures thereof;
    a thickening agent in the range of about 0.1% to about 5% by weight; and
    one or more of a chelator/dispersant/stabilizer compound selected from the group consisting of a chelator, a dispersant, a stabilizer, a non-ionic wetting agent, and combinations thereof, wherein a total weight % of the chelator/dispersant/stabilizer compound or compounds is in the range of about 0.1% to about 20% by weight;
    wherein the total calcium salts comprise about 2% to about 70% by weight of the composition, the water-insoluble calcium salts comprise at least about 50% by weight of a total of the water-insoluble and water-soluble calcium salts, and the composition is opaque and has a viscosity in the range of about 100 centipoise to 15,000 centipoise.

2. The aqueous fertilizer composition of claim 1 wherein the water-insoluble calcium salt is calcium carbonate.

3. The aqueous fertilizer composition of claim 1 wherein the chelator/dispersant/stabilizer is selected from the group consisting of sodium lignosulfonate, calcium lignosulfonate, humic acids, their salts and mixtures thereof.

4. The aqueous fertilizer composition of claim 1 wherein the water-soluble calcium salts are selected from the group consisting of calcium lignosulfonate, calcium acetate, calcium citrate and mixtures thereof.

5. The aqueous fertilizer composition of claim 1 wherein the thickening agent is selected from the group consisting of xanthan gum, hydroxyethylcellulose, hydroxypropylcellulose, guar gum and mixtures thereof.

6. The aqueous fertilizer composition of claim 1 wherein the thickening agent is xanthan gum.

7. The aqueous fertilizer composition of claim 1 wherein the water-insoluble calcium salt is calcium carbonate having a mean particle size of less than 20 microns.

8. The aqueous fertilizer composition of claim 1 wherein the water-insoluble calcium salt has a mean particle size of about 3 microns.

9. The aqueous fertilizer composition of claim 1 wherein the pH is equal to or greater than 7.0.

10. The aqueous fertilizer composition of claim 1 wherein the composition has a viscosity in the range of about 1000 centipoise to 10,000 centipoise.

11. The aqueous fertilizer composition of claim 1 wherein the total calcium salts comprise about 22% to about 50% by weight of the composition, the chelator/dispersant/stabilizer compounds comprise humic acid and its salts, a non-ionic wetting agent, and xanthan gum wherein the total weight % of the chelator/dispersant/stabilizer compounds comprises about 5% by weight of the composition.

12. The aqueous fertilizer composition of claim 1 wherein the chelator/dispersant/stabilizer is calcium ligninsulfonate and its salts.

13. The aqueous fertilizer composition of claim 1 wherein the chelator/dispersant/stabilizer is sodium ligninsulfonate and its salts.

14. The aqueous fertilizer composition of claim 1 wherein the chelator/dispersant/stabilizer is humic acid and its salts.

15. The aqueous fertilizer composition of claim 1 further comprising a biocide of at least 0.2% by weight of the composition.

16. The aqueous fertilizer composition of claim 1 further comprising at least one plant nutrient selected from the group consisting of boron, copper, iron, magnesium, manganese, zinc, their salts and mixtures thereof.

17. A method for providing immediately-available and slowly-released calcium to fertilize plants or crops while neutralizing the acidity present in the soil and acid precipitation, the method comprising applying the composition of claim 1 to the soil in which the plants or crops are present, a part of the plant selected from the group consisting of a leaf, flower, stem, root and combinations thereof, or combinations of the soil and plants wherein the fertilizer composition provides a reservoir of insoluble calcium salt that is released to the soil, plant or crop upon interaction with acid precipitation or soil acidity.

18. The method of claim 17 further comprising diluting the composition of claim 1 to prepare a diluted solution containing between 0.2% to 20% by weight total calcium salts and then applying the diluted solution to the plant, crop or soil.

19. The method of claim 17 wherein the applying step includes spraying or drip irrigation and provides for the composition to be topically applied to a plant or crop such that the composition will adhere to at least one surface of a plant or crop and drip into a plant's or crop's root zone.

20. A method to reduce or prevent sunscald and/or sunburn of plants or crops comprising topically applying the composition of claim 1 to a sun-exposed surface of the plants or crop to form an adherent, opaque film that reflects sunlight and slowly re-solubilizes over time.

\* \* \* \* \*